US012580415B2

(12) United States Patent
Cohen et al.

(10) Patent No.:     US 12,580,415 B2
(45) Date of Patent:        Mar. 17, 2026

(54) CONFIGURABLE HARVESTER

(71) Applicant: Wiliot, Ltd., Caesarea (IL)

(72) Inventors: Tom Cohen, Haifa (IL); Alon Yehezkely, Haifa (IL)

(73) Assignee: Wiliot, Ltd., Caesarea (IL)

( * ) Notice: Subject to any disclaimer, the term of this patent is extended or adjusted under 35 U.S.C. 154(b) by 4 days.

(21) Appl. No.: 18/397,311

(22) Filed: Dec. 27, 2023

(65) Prior Publication Data

US 2025/0219446 A1     Jul. 3, 2025

(51) Int. Cl.
H02J 50/00         (2016.01)
H02J 7/00          (2006.01)
H02J 50/20         (2016.01)

(52) U.S. Cl.
CPC .......... H02J 50/001 (2020.01); H02J 7/0034 (2013.01); H02J 7/00712 (2020.01); H02J 50/20 (2016.02)

(58) Field of Classification Search
CPC .... H02J 50/001; H02J 7/0034; H02J 7/00712; H02J 50/20
See application file for complete search history.

(56) References Cited

U.S. PATENT DOCUMENTS 10,716,339 B1 *   7/2020   Borras .................... H02J 1/108
2015/0311707 A1 *  10/2015   Ikenaga ................. H02J 50/40
                                                         307/71
2025/0024478 A1 *   1/2025   Zheng ................. H04W 72/115

* cited by examiner

*Primary Examiner* — Daniel Cavallari
(74) *Attorney, Agent, or Firm* — M&B IP Analysts, LLC

(57)        ABSTRACT

According to a first aspect of the present disclosed subject matter, a configurable harvester energized by radio-frequency (RF) inputs and stores direct current (DC) in an accumulator, the harvester comprises: a plurality of gangs each comprising at least one rectifier powered by RF input; and at least one selector configured to interconnect the gangs either in series or in parallel; wherein an output of the interconnected gangs charges the accumulator with DC.

20 Claims, 3 Drawing Sheets

SENSITIVE MODE

FAST MODE

CONFIGURABLE HARVESTER

TECHNICAL FIELD

The present disclosed subject matter generally relates to internet of things (IoT). More particularly, the present disclosed subject matter relates to power harvester of passive IoT.

BACKGROUND

The IoT revolution poses challenges due to the reliance on batteries, leading to environmental and economic concerns. This introduces the concept of energy harvesting as a solution to extend battery life or eliminate batteries altogether, focusing on various industries where this technology is making an impact. The conclusion emphasizes the need for low-power consumption and energy harvesting to reduce battery-related costs and environmental impact while promoting sustainable innovation in the IoT.

RF energy harvesting harnesses electromagnetic waves to provide wireless power for battery-free devices, offering a promising alternative energy source. This technology allows dynamic energy recharging of wireless devices and supports environmentally friendly energy sources. energy harvesting derives energy from surrounding sources like mobile phones, Wi-Fi, and broadcast signals, capturing it with a receiving antenna and converting it into direct current voltage.

Commercially available RF energy harvesting technology addresses IoT power requirements in a uniform manner and does not consider individual IoT power consumption. Harvesting efficiency varies from one IoT device to another, depending on factors such as the IoT's physical location, configured tasks, time of day, and the duty cycles of its tasks.

It would therefore be the objective of the present disclosure to provide a solution that overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

According to a first aspect of the present disclosed subject matter, a configurable harvester energized by radio-frequency (RF) inputs and stores direct current (DC) in an accumulator, the harvester comprises: a plurality of gangs each comprising at least one rectifier powered by RF input; and at least one selector configured to interconnect the gangs either in series or in parallel; wherein an output of the interconnected gangs charges the accumulator with DC.

In some exemplary embodiments, the rectifiers of each gang of the plurality of gangs are serially connected to one another.

In some exemplary embodiments, the selector comprises: a first switch; a second switch; and a third switch.

In some exemplary embodiments, the harvester is set to a fast mode by selecting with the at least one selector to interconnect the gangs in parallel.

In some exemplary embodiments, the harvester is set to a sensitive mode by selecting with the at least one selector to interconnect the gangs in a series.

In some exemplary embodiments, the output of the last gang in the series charges the accumulator.

In some exemplary embodiments, the outputs of all the gangs are connected in parallel via anti-leakage diodes into the accumulator.

In some exemplary embodiments, the plurality of gangs serially feed one another so that a last gang of the plurality of gangs charges the accumulator.

In some exemplary embodiments, the outputs of the plurality of gangs' parallelly charges the accumulator.

In some exemplary embodiments, the first switch is off while the second and third switches are on in fast mode.

In some exemplary embodiments, the gang's output is connected via anti-leakage diodes to the accumulator, and a gang's input is connected to the ground.

In some exemplary embodiments, the first switch is on while the second and third switches are off in sensitive mode.

In some exemplary embodiments, the gang's output is connected to an input of a following gang.

In some exemplary embodiments, the alternating current (AC) inputs of all rectifiers are connected to the RF input.

In some exemplary embodiments, the at least one selector is governed by a sensitive/fast toggle signal.

According to another aspect of the present disclosed subject matter, an internet of things (IoT) device comprising: a configurable harvester energized by radio-frequency (RF) inputs and stores direct current (DC) in an accumulator; an antenna used by the configurable harvester to harvest electromagnetic energy; and a controller configured to activate the configurable harvester in sensitive or fast mode; and wherein the energy is stored in an accumulator.

In some exemplary embodiments, the controller uses a sensitive/fast selector signal to switch the configurable harvester from a sensitive mode to a fast mode and vice versa.

In some exemplary embodiments, the controller switches the configurable harvester to the sensitive mode during poor electromagnetic energy conditions and to fast mode during rich energy conditions.

In some exemplary embodiments, the antenna is designed to receive and transmit radio-frequency (RF) signals in a range of Bluetooth Low Energy (BLE) communication.

In some exemplary embodiments, the IoT device further comprises a power management unit configured to regulate and provide power into multiple DC voltage levels for the operation of controller and its subcomponents.

In some exemplary embodiments, the configurable comprises: a plurality of gangs each comprising at least one rectifier powered by RF input; and at least one selector configured to interconnect the gangs either in series or in parallel; wherein an output of the interconnected gangs charges the accumulator with DC.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

In the drawings.

DETAILED DESCRIPTION

Figure 1:
FIG. 1 shows a block diagram of a configurable harvester in a sensitive mode configuration, in accordance with some exemplary embodiments of the disclosed embodiments.
Figure 1:
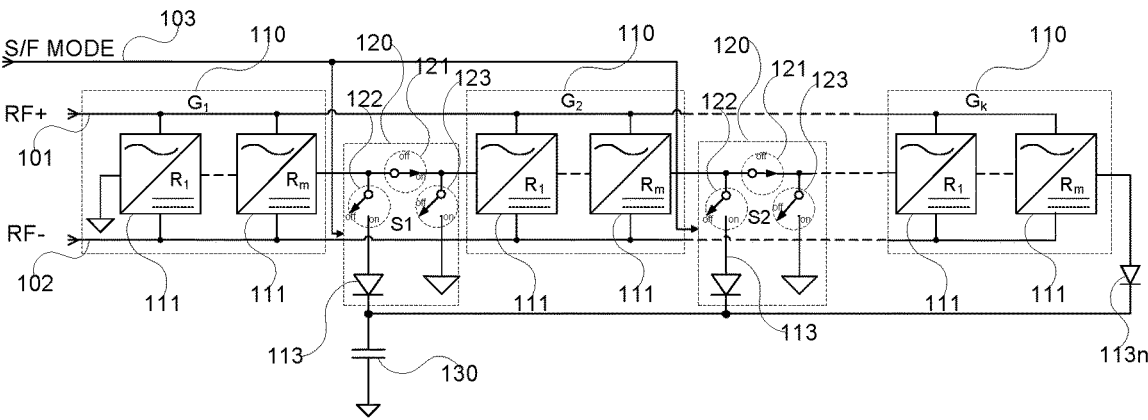

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

According to one technical solution in the present disclosure, a configurable RF harvester is provided. This configurable RF harvester (CRH) is an innovative mechanism incorporated into a passive IoT device. It is configured to switch the IoT device's harvester between a sensitive mode (S-Mode) and a fast mode (F-Mode) to match the IoT device's condition and activity.

In some exemplary embodiments, the CRH allows for real-time changes in the harvesting mode of operation. For example, switching between modes enables IoT devices to function from longer distances in places where the energy is low, i.e., S-Mode, and function faster in places rich in energy, i.e., F-Mode.

FIG. 1 depicts a block diagram of a configurable harvester (CRH) 100 operating in a sensitive mode configuration. In some exemplary embodiments, CRH 100 can be implemented with a plurality of rectifiers (REC) 111, organized into multiple gangs (GNG) 110. These gangs are interconnected using a Selector 120. In the illustrated embodiment of FIG. 1, CRH 100 comprises {k} GNGs 110, each including {m} RECs 111, resulting in a total of {n}=[{m}*{k}] RECs 111 connected in series, creating a CRH 100 that operates in S-Mode.

It should therefore be understood that Selector 120 controls the operation modes of CRH 100, i.e., selecting between S-Mode and F-Mode. Hence GANGs 110 shall be connected in series in S-Mode.

In S-Mode embodiments, the AC inputs of all RECs 111 are connected in parallel to an RF input signal, while the DC output of each REC 111 feeds into the DC input of the next REC 111 in the series.

In some exemplary embodiments, all RECs 111 are connected in parallel to RF signal obtained from an IoT antenna (not shown), using the negative RF input (RF−) 102 and positive RF input (RF+) 101.

In the S-Mode configuration of CRH 100, as shown in FIG. 1, the output DC voltage is collected by an Accumulator 130, which may be implemented as at least one capacitor, a rechargeable battery, or a combination of both. In the S-Mode the DC voltage is output from the last REC 111 of CRH 100 through Diode 113$n$ into Accumulator 130.

In some exemplary embodiments, In the S-Mode the voltage $V_{out}$ across Accumulator 130 can be given by $V_{out} \cong N \cdot V_{RF}$, where {N} is the total number of REC 111, i.e., {n}=[{m}*{k}], and $V_{RF}$ is the input voltage.

It will be appreciated that S-Mode of CRH 100 is suitable for application where the IoT devices operate from longer distance in places having poor wireless energy.

In some exemplary embodiments, the IoT device that hosts a harvester, such as the CRH 100 of the present disclosure, includes a processor configured to enable real-time mode selection using a Sensitive/Fast selector signal (S/F) 103. This signal allows the device to switch to S-Mode during poor energy conditions or F-Mode during rich energy conditions. It should therefore be appreciated that CRH 100 facilitates the harvesting efficiency yielding faster charging and shorter time between packets.

In the S-Mode configuration of the CRH 100, as shown in FIG. 1, S/F 103 is set to activate Selectors 120 of the CRH 100, to turn Switch 121 'on' and turn Switches 122 and 123 'off.' This action connects all RECs 111 of the CRH 100 in series.

Figure 2:
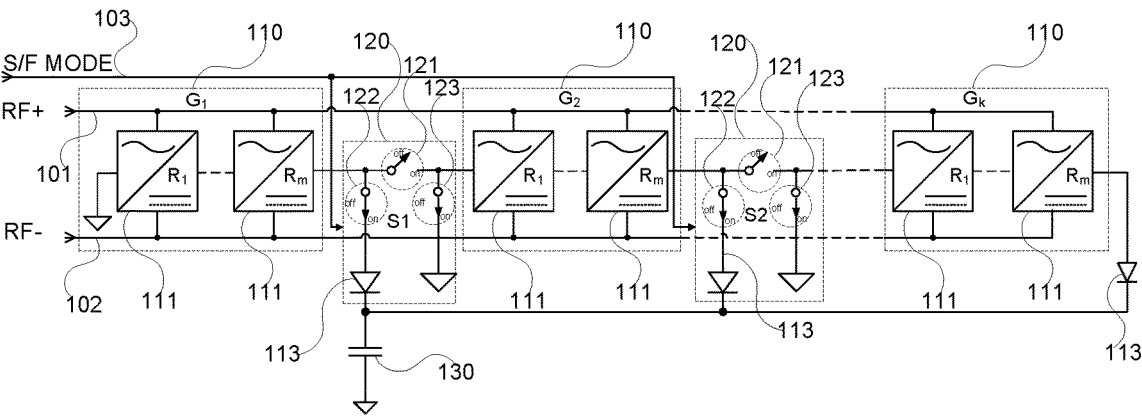
FIG. 2 shows a block diagram of a configurable harvester in a fast mode configuration in accordance with some exemplary embodiments of the disclosed embodiments.

FIG. 2 depicts a block diagram of a configurable harvester (CRH) 100 operating in a fast mode configuration. In some exemplary embodiments, CRH 100 can be implemented with a plurality of rectifiers (REC) 111, organized into multiple gangs (GNG) 110. These gangs are interconnected by a Selector 120. In the illustrated embodiment of FIG. 2, CRH 100 includes {k} GNGs 110 connected in parallel, where each GNG 110 includes {m} RECs 111, connected in series for creating a CRH 100 that operates in F-Mode.

It should therefore be understood that Selector 120 controls the operation modes of CRH 100, i.e., selecting between S-Mode and F-Mode. Hence GANGs 110 shall be connected in parallel in F-Mode.

It's worth noting that in the F-Mode configuration, the AC inputs of all RECs 111 are connected in parallel to an RF input signal, while the DC output of each GNG 110 is connected to Accumulator 130 via Diode 113. In some exemplary embodiments, Diode 113 is an anti-leakage diode designed to prevent reverse leakage from Accumulator 130. It should be noted that DC output of each REC 111 within GNG 110 feeds into the DC input of the next REC 111 and the DC input of a first REC 111 in each GNG 110 is grounded.

In some exemplary embodiments, all RECs 111 are connected in parallel to RF signal obtained from an IoT antenna (not shown), using the negative RF input (RF−) 102 and positive RF input (RF+) 101.

In the F-Mode configuration of CRH 100, as shown in FIG. 2, the output DC voltage of all GNGs 110 is collected by an Accumulator 130, which may be implemented as at least one capacitor, a rechargeable battery, or a combination of both.

In the F-Mode the voltage $V_{out}$ across Accumulator 130 can be given by $$V_{out} \cong \frac{N}{k} \cdot V_{RF},$$

where {N} is the total number of REC 111, i.e., {n}= [{m}*{k}], {k} is the total number of GNG 110, and $V_{RF}$ is the input voltage.

It will be appreciated that F-Mode of CRH 100 is suitable for application where the IoT devices operate from short distance in places having rich wireless energy.

In some exemplary embodiments, the IoT device that hosts a harvester, such as the CRH 100 of the present disclosure, includes a processor configured to enable real-time mode selection using a signal S/F 103. This signal allows the device to switch to F-Mode during rich energy conditions or S-Mode during poor energy conditions. Therefore, it should be noted that CRH 100 facilitates the harvesting efficiency yielding faster charging and shorter time between packets.

In the F-Mode configuration of the CRH 100, as shown in FIG. 2, S/F 103 is set to activate Selectors 120 of the CRH 100, to turn Switch 121 'off' and turn Switches 122 and 123 'on.' This action connects all GNG 110 of the CRH 100 in parallel.

Figure 3:
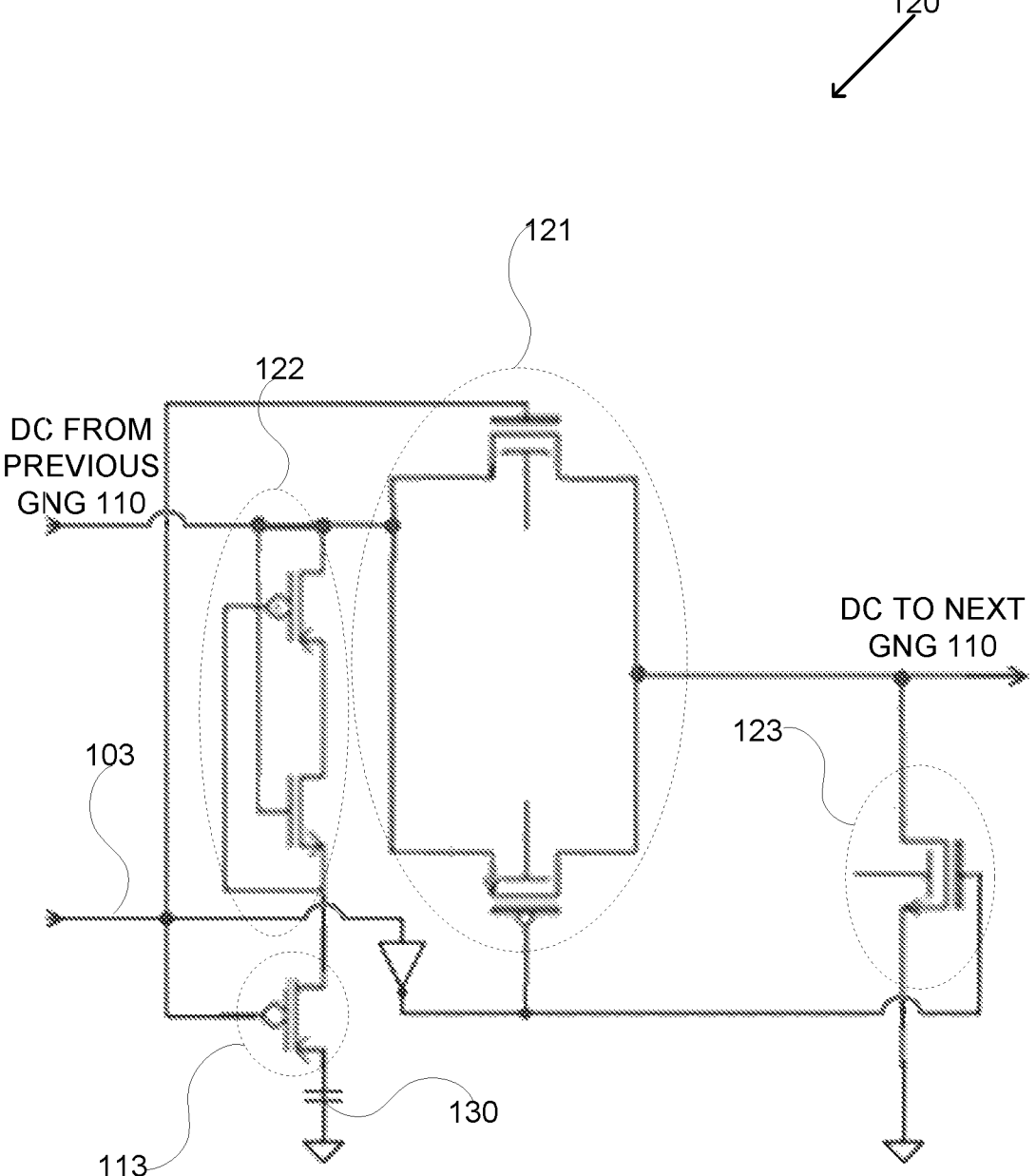
FIG. 3 schematically depicts a mode selector circuit, in accordance with some exemplary embodiments of the disclosed embodiments.

FIG. 3 schematically depicts a mode selector circuit (Selector) 120. In some exemplary embodiments, Selector 120 may be comprised of three switches: Switch 121, Switch 122, and Switch 123; and anti-leakage Diode 113 that is governed by a S/F 103 signal. Each switch has an off-state and an on-state.

In F-Mode, S/F 103 is set to turn Switch 121 to off-state and Switches 122 and 123 to on-state. Thereby isolating DC output of previous stage from DC input of next stage while connecting the DC output of the previous GNG 110 to Accumulator 130, and the DC input of the next GNG 110 to ground.

In the S Mode S/F 103 is set to turn Switch 121 to on-state and Switches 122 and 123 to off-state. Thereby connecting DC output from previous stage (GNG 110) to DC input of next stage. And disconnecting previous stage from Accumulator 130, and next stage from ground.

In some exemplary embodiments, Selector 120 may be implemented using devices with low leakage and high resistance characteristics based on technologies such as Extremely-Low Threshold Voltage in p-channel metal-oxide-semiconductor (ELVT-pMOS) and Super Low Voltage Threshold in n-channel metal-oxide-semiconductor (SLVT-nMOS), among others.

Figure 4:
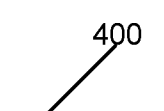
FIG. 4 shows a block diagram of Internet of Things device (IoT) in accordance with some exemplary embodiments of the disclosed embodiments.
Figure 4:
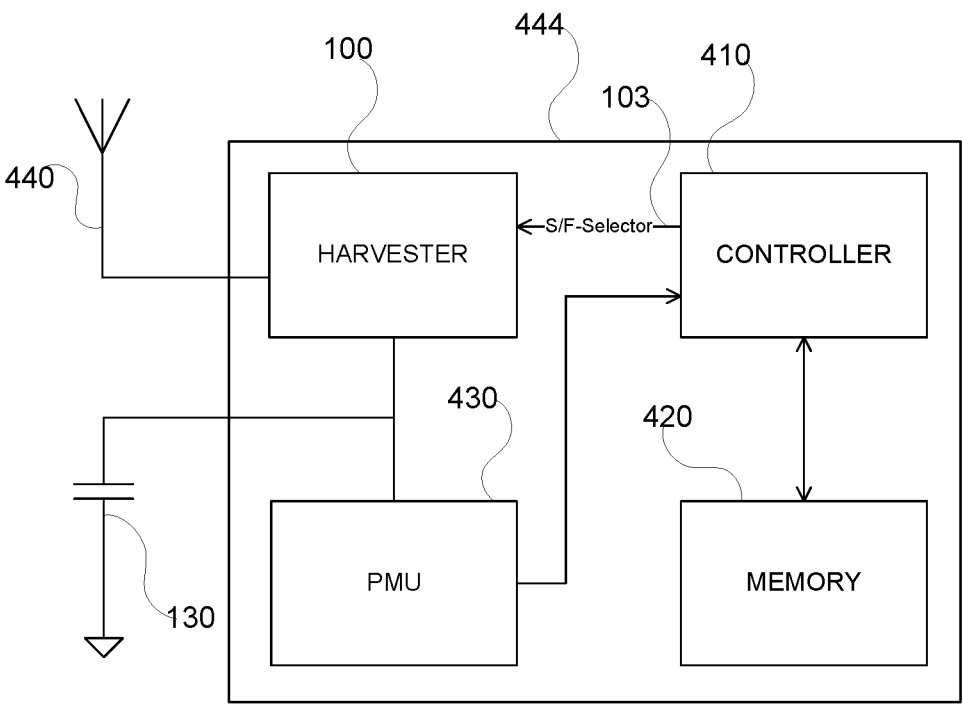

FIG. 4 shows a block diagram of Internet of Things device (IoT) 400 designed according to some exemplary embodiments of the disclosed subject matter.

In some exemplary embodiments, IoT 400 may include a System on a Chip (SoC) 444, an Antenna 440, and an Accumulator 130.

Antenna 440 includes at least one conductive pattern made of aluminum, copper, silver, and the like, or any combination thereof. Antenna 440 may be printed or etched onto a thin flexible insulating substrate.

In some exemplary embodiments, Antenna 440 is primarily designed to receive and/or transmit radio-frequency (RF) signals in a range of 2.4 to 2.5 Gigahertz (GHz), i.e., Bluetooth Low Energy (BLE) communication. Additionally, or alternatively, Antenna 440 may be adapted to receive RF signals in a plurality of RF bands in addition to the BLE range, used for harvesting electromagnetic energy.

Accumulator 130 may be used to store electrical energy for the operation of IoT 400. In some exemplary embodiments, Accumulator 130 may be an on-die capacitor, i.e., an integral part of SoC 444, and/or at least one external capacitor. Additionally, or alternatively, Accumulator 130 may include at least one chargeable battery. It should be noted that capacitors store electrical energy in the form of electrical charge accumulated on their plates. When a capacitor is connected to a power source, it accumulates energy that can be released when the capacitor is disconnected from the charging source.

SoC 444 may include a Controller 410, the configurable harvester (CRH) 100, a Memory 420, and a Power Management Unit (PMU) 430. In some exemplary embodiments, SoC 444 may be realized in a semiconductor die that is glued to the substrate of IoT 400. It should be noted that IoT 400 does not include any external DC power source, such as a battery.

SoC 444 can be implemented as firmware written for or ported to a specific processor, such as a Digital Signal Processor (DSP), or an application-specific integrated circuit (ASIC). In some exemplary embodiments, Controller 410 may be a Processing Unit (CPU), a microprocessor, utilized to perform computations required by SoC 444 or any of its subcomponents.

In some exemplary embodiments, Controller 410 includes a number of execution functions realized as analog circuits, digital circuits, or both. Memory 420 may be configured to retain data and program instructions to independently carry out processes.

Memory 420 may be a centralized area that is constantly powered. Data to be retained during low power states is located in the Memory 420. In some exemplary embodiments, Memory 420 is optimized to subthreshold or near threshold voltage, e.g., 0.3V-0.4V. to allow for the reduction of the leakage of the retention cells.

In some exemplary embodiments, Controller 410 is partitioned into multiple power domains. Each power domain is a collection of gates powered by the same power and ground supply. To reduce power consumption, only one power domain is turned on during execution. Controller 410 can perform functions, such as memory read/write; interface with input-output components; executing logic operations; tracking the power level of CRH 100; generating and preparing data packets for transmission; cyclic redundancy check (CRC) code generation; packet whitening; encrypting/decrypting and authenticating packets; converting data from parallel to serial; and staging the packet bits to the analog transmitter path for transmission.

Additionally, or alternatively, Controller 410 is configured to enable real-time mode selection using signal S/F 103.

In some exemplary embodiments, Controller 410 performs various functions, allowing communication using a low-power communication protocol. Examples of such a protocol include but are not limited to, Bluetooth®, LoRa, Wi-Gi®, nRF, DECT®, Zigbee®, Z-Wave, EnOcean, and the like. In a preferred embodiment, Controller 410 operates using a Bluetooth Low Energy (BLE) communication protocol.

In some exemplary embodiments, CRH 100 is configured to harvest electromagnetic energy received by Antenna 440 and provide DC voltage for the operation SoC 444, while maintaining a low loading DC dissipation value. In some exemplary embodiments, CRH 100 may include a Dickson voltage multiplier (not shown) coupled to the antenna 440. In some exemplary embodiments, the harvested energy may be stored in Accumulator 130 by CRH 100, which is also configured to regulate the power into multiple DC voltage levels for the operation of SoC 444 and its subcomponents. Due to the limited capacitance of Accumulator 130, power consumption should be carefully managed. This management is carried out to prevent the depletion of Accumulator 130, thereby avoiding a reset of Controller 410.

In some exemplary embodiments, PMU 430 may be configured to provide multi-level voltage indications to Controller 410, enabling Controller 410 to determine the state of a voltage supply at any given time when Accumulator 130 is charging or discharging. For this purpose, PMU 430 utilizes a detection circuitry (not shown) controlled by Controller 410. In some exemplary embodiments, the detection circuitry includes different voltage reference threshold detectors, with only a subset of such detectors active at a given time to perform the detection.

In some exemplary embodiments, PMU 430 is coupled to the Accumulator 130 and is configured to regulate the power to Controller 410. Specifically, as the capacitance of the Accumulator 130 is very limited, the power consumption should be carefully maintained. This maintenance is performed to avoid draining the Accumulator 130, thus resetting the Controller 410. In another embodiment, the PMU 430 may be further configured to provide multi-level voltage level indications to the Controller 410. Such indications allow Controller 410 to determine the state of a voltage supply at any given moment when Accumulator 130 charges or discharges. According to this embodiment, the PMU 430 may include detection circuitry controlled by a controller. The detection circuitry includes different voltage reference threshold detectors, where only a subset of such detectors is active at a given time to perform the detection.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A configurable harvester energized by radio-frequency (RF) inputs and stores direct current (DC) in an accumulator, the harvester comprises:
   a plurality of gangs each comprising at least one rectifier powered by an RF signal supplied via an RF input; and
   at least one selector configured to interconnect the gangs either in series or in parallel based on a present state of a real-time mode signal, the present state of the real-time mode signal being determined based on energy availability conditions in an environment of the harvester;
   wherein an output of the interconnected gangs charges the accumulator with DC.

2. The harvester of claim 1, wherein rectifiers of each gang of the plurality of gangs are serially connected to one another.

3. The harvester of claim 1, wherein the selector comprises: a first switch; a second switch; and a third switch.

4. The harvester of claim 3, wherein the harvester is set to a fast mode by selecting with the at least one selector to interconnect the gangs in parallel.

5. The harvester of claim 3, wherein the harvester is set to a sensitive mode by selecting with the at least one selector to interconnect the gangs in a series.

6. The harvester of claim 4, wherein output of the last gang in the series charges the accumulator.

7. The harvester of claim 5, wherein outputs of all the gangs are connected in parallel via anti-leakage diodes into the accumulator.

8. The harvester of claim 1, wherein the plurality of gangs serially feed one another so that a last gang of the plurality of gangs charges the accumulator.

9. The harvester of claim 1, wherein outputs of the plurality of gangs parallelly charges the accumulator.

10. The harvester of claim 4, wherein the first switch is off while the second and third switches are on in fast mode.

11. The harvester of claim 10, wherein a gang's output is connected via anti-leakage diodes to the accumulator, and a gang's input is connected to the ground.

12. The harvester of claim 5, wherein the first switch is on while the second and third switches are off in sensitive mode.

13. The harvester of claim 12, wherein a gang's output is connected to an input of a following gang.

14. A configurable harvester energized by radio-frequency (RF) inputs and stores direct current (DC) in an accumulator, the harvester comprises:
   a plurality of gangs each comprising at least one rectifier powered by an RF signal supplied via an RF input; and
   at least one selector configured to interconnect the gangs either in series or in parallel;
   wherein an output of the interconnected gangs charges the accumulator with DC; and
   wherein alternating current (AC) inputs of all rectifiers are connected to the RF input.

15. An internet of things (IoT) device comprising:
   a configurable harvester energized by radio-frequency (RF) inputs and stores direct current (DC) in an accumulator;
   an antenna used by the configurable harvester to harvest electromagnetic energy; and
   a controller configured to activate the configurable harvester in sensitive or fast mode, the mode being based on a present state of a real-time mode signal, the present state of the real-time mode signal being determined based on energy availability conditions in an environment of the harvester;

wherein the energy is stored in an accumulator.

16. The IoT device of claim 15, wherein the controller uses a sensitive/fast selector signal to switch the configurable harvester from a sensitive mode to a fast mode and vice versa.

17. The IoT device of claim 16, wherein the controller switches the configurable harvester to the sensitive mode during poor electromagnetic energy conditions and to fast mode during rich energy conditions, wherein during the rich energy conditions an environment of the IoT device has more ambient electromagnetic energy than in the poor energy conditions.

18. The IoT device of claim 15, wherein the antenna is adapted to receive and transmit radio-frequency (RF) signals in a range of Bluetooth Low Energy (BLE) communication.

19. The IoT device of claim 15, further comprises a power management unit configured to regulate and provide power into multiple DC voltage levels for operation of the controller and its subcomponents.

20. The IoT device of claim 15, wherein the configurable comprises:

a plurality of gangs each comprising at least one rectifier powered by RF input; and at least one selector configured to interconnect the gangs either in series or in parallel; wherein an output of the interconnected gangs charges the accumulator with DC.

* * * * *